Jan. 19, 1965  G. F. QUAYLE  3,166,207
CONTROL FOR LOAD SIDE SHIFTING

Filed March 2, 1961  9 Sheets-Sheet 1

INVENTOR.
GEORGE F. QUAYLE
BY
ATTORNEY

Jan. 19, 1965   G. F. QUAYLE   3,166,207
CONTROL FOR LOAD SIDE SHIFTING
Filed March 2, 1961   9 Sheets-Sheet 4

INVENTOR.
GEORGE F. QUAYLE
BY
ATTORNEY

Fig.10A.

United States Patent Office 3,166,207
Patented Jan. 19, 1965

3,166,207
CONTROL FOR LOAD SIDE SHIFTING
George F. Quayle, Philadelphia, Pa., assignor, by mesne assignments, to Yale & Towne, Inc., New York, N.Y., a company of Ohio
Filed Mar. 2, 1961, Ser. No. 92,841
5 Claims. (Cl. 214—653)

This invention relates to an industrial truck of the type incorporating a pair of load clamps which may be moved toward and away from each other to engage or release a load, and may also be moved in unison transversely of the truck to facilitate placement or engagement of the load. This latter movement is commonly referred to as "side shifting."

If a load carried by the clamps of a truck of this type is side shifted too far to one side or the other other of the center line of the truck, the truck will tip over sideways with resulting damage to the truck and load, as well as injury to the operator of the truck. The purpose of this invention is to provide a novel control system which will sense or detect side shifting of the load clamps and actuate a suitable warning device, or stop further side shifting of the clamps before the safe limit of side shifting has been reached, so as to avoid sideways tipping of the truck by the load.

Recognizing that the center of gravity of the usual load will normally coincide with the median vertical axis or center point located between the load clamps, the control system of the invention includes a sensing mechanism which will sense or detect transverse movement of the center point between the clamps, regardless of the spacing of the clamps, and will actuate control means to operate a warning device or stop further side shifting of the center point when the center point has moved a predetermined distance on either side of the center line of the truck, corresponding to the safe limit. As the sensing mechanism only senses or detects side shifting of the center point between the clamps, and as the control means are actuated by the sensing mechanism, the control means are not actuated when the clamps are moved toward or away from each other at equal speeds when engaging or releasing a load, as under such circumstances the center point between the clamps remains in the same position even though the clamps move relatively to one another. Thus, the control system distinguishes between movement of the clamps resulting in side shifting movement of the center point between the clamps and movement of the clamps resulting in substantially no side shifting of the center point, so that the clamps may be moved apart to engage a relatively wide load without actuating the control means.

The control system of the invention is particularly well suited for industrial trucks which incorporate hydraulic rams for moving the load clamps, and the incorporation of the control system in the hydraulic circuit for such rams forms an important feature of the invention. In such trucks, the same rams are commonly used both to side shift the clamps in unison and to move the clamps relatively to one another to engage or release a load. To side shift the clamps, the rams are connected in series, and to move the clamps relative to one another the rams are connected in parallel. When the rams are connected in parallel and are being moved to engage a load, it is possible for the center point between the clamps to shift transversely of the truck due to unequal movement of the clamps such as may occur if one clamp engages a load first so that all fluid flows to the ram for the other clamp. If this transverse movement of the center point between the clamps is excessive, the load may be picked up with the center of gravity beyond the safe distance from the center line of the truck. This, however, may be prevented by use of the control system of the invention, as the sensing mechanism will detect movement of the center point beyond the safe limit and actuate the control means to either operate a warning device or prevent relative movement between the clamps resulting in side shifting of the center point beyond the safe limit. At the same time, the control system of the invention will also detect excessive side shifting of the center point between the clamps by operation of the rams in series to side shift the load clamps in unison.

The invention and its advantages having been broadly described, a more detailed description of the invention is given hereafter by reference to the accompanying drawings.

Figure 1:
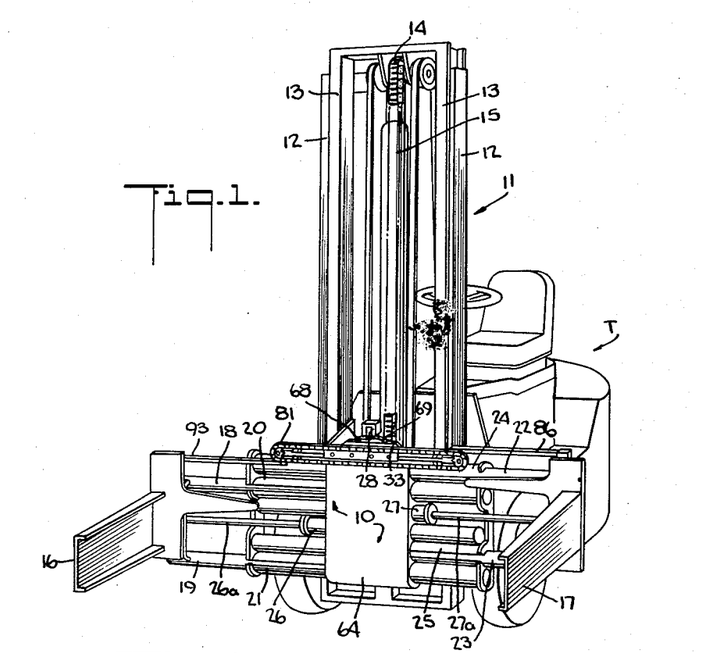
FIG. 1 is a perspective view of an industrial truck incorporating a pair of hydraulically operated side shifting load clamps and a control system constructed in accordance with the invention for controlling and limiting side shifting movement of the load clamps.

Referring to the drawings and particularly to FIG. 1, the control system of the invention is shown applied to a conventional lift truck T. While the particular truck illustrated is of the type described in U.S. Patent No.

2,795,346, it will be appreciated that the control system may be used on other types and styles of industrial trucks.

The particular details of the truck form no part of the invention and it is sufficient to an understanding of the invention to point out that the truck includes a load carriage 10 mounted for vertical movement in the well-known manner on a conventional mast structure 11 which includes a pair of stationary or primary uprights 12 and a pair of movable or secondary uprights 13. The load carriage 10 and the secondary uprights 13 are adapted to be elevated through chains 14 by a hydraulic ram 15 in the conventional manner.

The load carriage 10 is provided with a pair of load clamps 16 and 17 which are mounted for movement transversely of the load carriage 10 so that they may be moved relatively to one another to engage or release a load, and may also be moved in unison transversely of the truck to facilitate the placement and engagement of a load.

Clamp 16 is conveniently mounted for such transverse movement by means of upper and lower horizontal shafts 18 and 19 which are rigidly secured to the clamp 16 at their outer ends and are slidably received at their inner ends in upper and lower tubular bearings 20 and 21. The bearings 20 and 21 are rigidly secured to the load carriage 10.

Clamp 17 is similarly mounted for transverse movement by means of upper and lower horizontal shafts 22 and 23 which are slidably received in upper and lower horizontal tubular bearings 24 and 25 which are also rigidly secured to the load carriage 10.

The clamp 16 is adapted to be moved transversely of the load carriage 10 by means of a horizontally disposed hydraulic ram 26 which is rigidly secured to the load carriage 10 and has a piston rod 26a which is secured to the clamp 16. The clamp 17 is adapted to be moved transversely of the load carriage 10 by means of an oppositely disposed horizontal hydraulic ram 27, which is also rigidly secured to the load carriage 10 and has a piston rod 27a which is secured to the clamp 17. This structure is shown diagrammatically in FIG. 10.

Figures 9, 10:
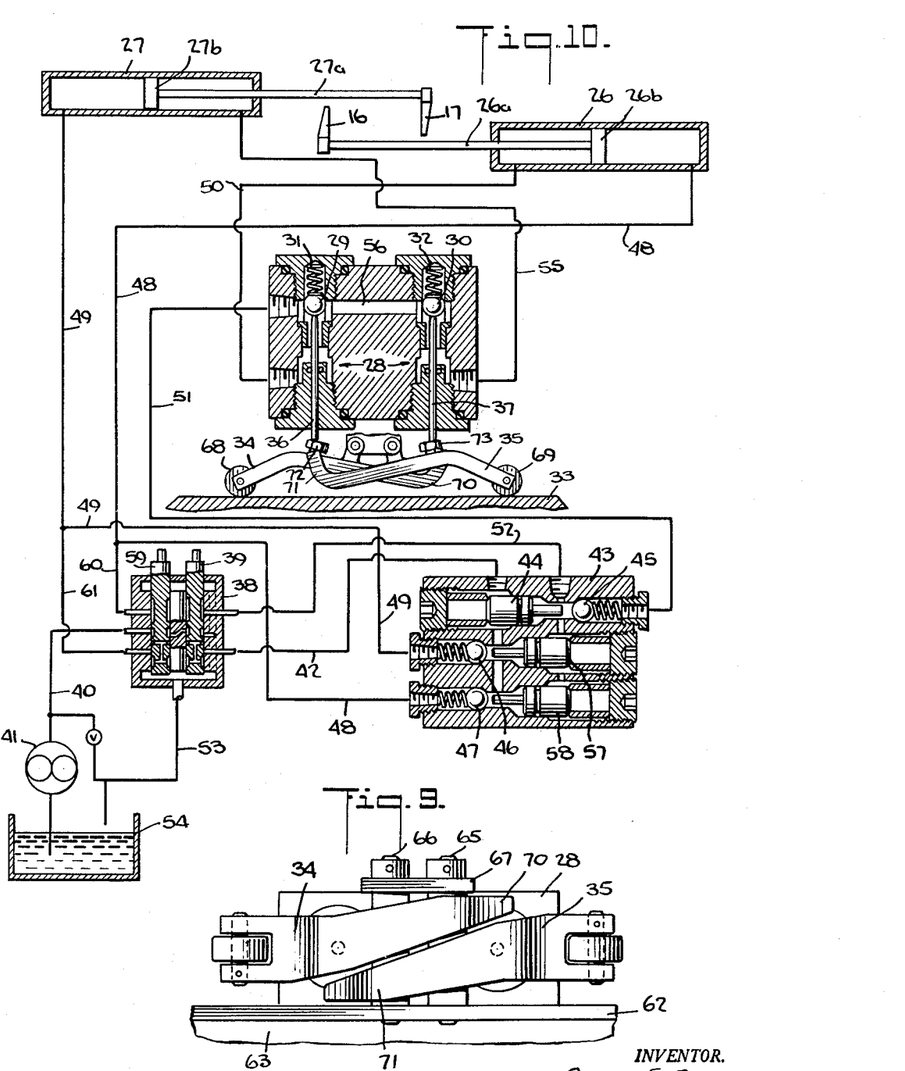
FIG. 9 is a sectional view taken on the line 9—9 of FIG. 6.
FIG. 10 is a schematic view of the hydraulic circuit for controlling movement of the load clamps.

The rams 26 and 27 may be operated to move the clamps 16 and 17 relatively to one another to clamp or to release a load, or may be operated to side shift the clamps 16 and 17 in unison in one direction or the other transversely of the truck. A control circuit for providing such operation of the rams is shown in FIG. 10. The particular control circuit there illustrated is identical to that shown in U.S. Patent No. 2,795,346, except that it has been modified in accordance with one form of the invention by the addition of a valve unit 28 which incorporates two independent ball check valves 29 and 30 which are urged toward closed positions by springs 31 and 32. As will be described in detail hereafter, the closing of one or the other of the ball check valves 29 or 30 prevents excessive side shifting in one direction or the other.

A movable control member or cam 33 controls the opening and closing of the ball check valves 29 and 30 through pivotally mounted operating levers 34 and 35 and actuating rods 36 and 37. When the cam 33 is centered relatively to the center line of the truck, it holds the levers 34 and 35 and rods 36 and 37 in a position holding the ball check valves 29 and 30 open as shown in FIG. 10. When, however, the cam 33 is moved a predetermined distance to the right or left, it releases either lever 34 or 35 to allow rod 36 or rod 37 to move downwardly so that either ball check valve 29 or 30 is closed by is spring to prevent further side shifting movement of the center point between the clamps in the same direction.

Figure 10A:
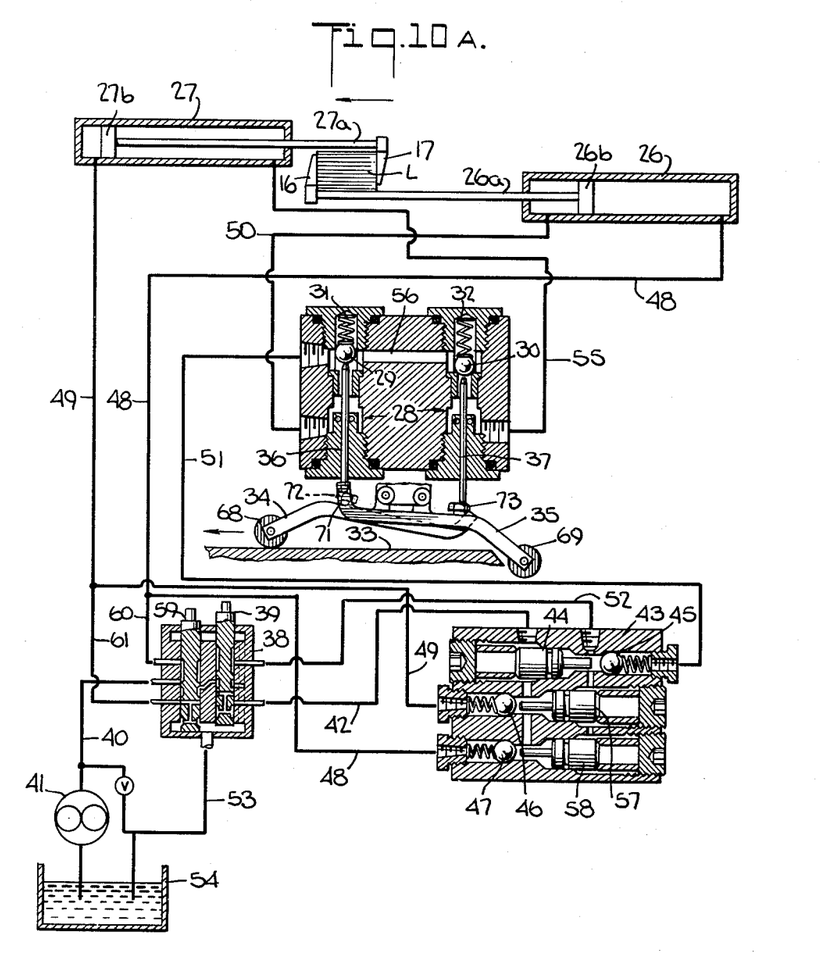
FIG. 10A is a schematic view, similar to that of FIG. 10, but showing the load clamps side shifted in unison to the left and showing the control system of the invention actuated to prevent further side shifting movement in the same direction.
Figure 10B:
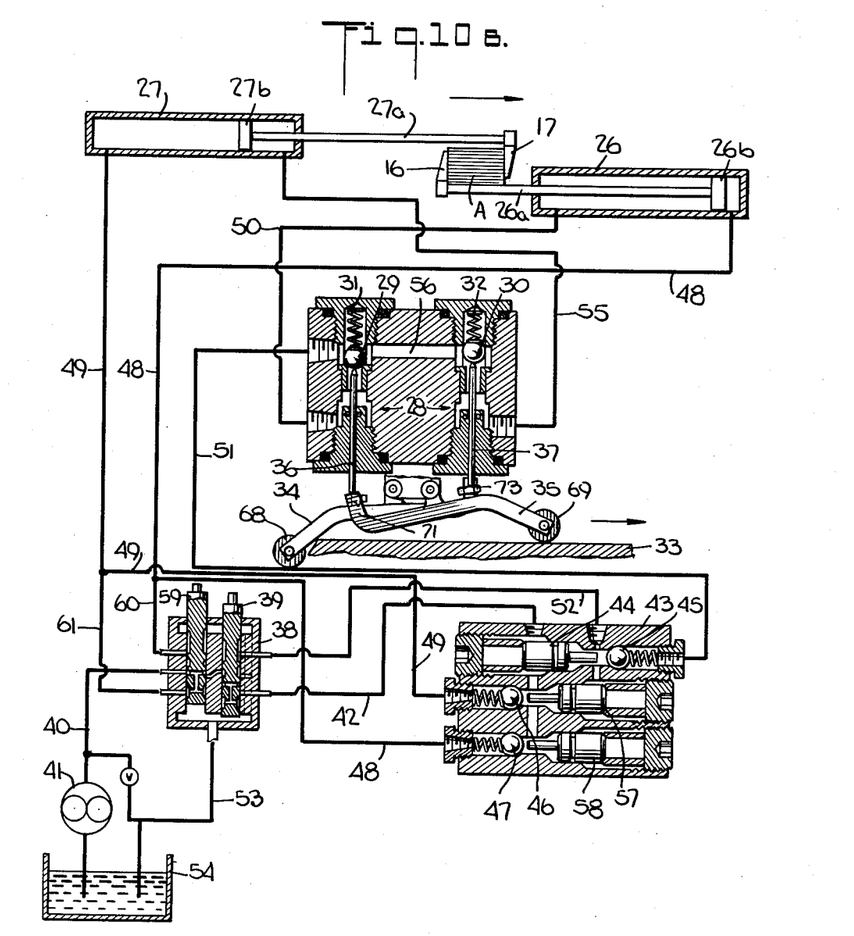
FIG. 10B is a schematic view, similar to that shown in FIG. 10, but showing the load clamps side shifted in unison to the right and showing the control system of the invention actuated to prevent further side shifting movement in the same direction.

As will be described in detail hereafter, the cam 33 is moved by a sensing mechanism which senses or detects transverse movement of the median vertical axis or center point located between the clamps 16 and 17 and moves the cam 33 in response to such transverse movement of the center point to release either ball check valve 29 as shown in FIG. 10B or ball check valve 30 as shown in FIG. 10A to prevent excessive side shifting to the right or to the left. When, however, the clamps 16 and 17 are moved toward and away from each other at the same speeds, there is no transverse movement of the center point and cam 33 is not moved by the sensing mechanism. The spacing between the clamps therefor can be varied without closing the valves 29 and 30.

When the ball check valves 29 and 30 are open as shown in FIG. 10, the control circuit functions in exactly the same manner as described in U.S. Patent No. 2,795,346. Thus, if it is desired to move the clamps 16 and 17 apart to release a load, or to dispose the clamps in position for gripping a load, a slide 39 of a control valve 38 is moved upwardly from the position shown in FIG. 10 to connect a line 40 from a pump 41 with a line 42 to admit fluid under pressure through the line 42 to a valve unit 43. The admission of fluid under pressure through line 42 to valve unit 43 causes a piston 44 to unseat a ball check valve 45 of the valve unit 43, and also causes ball check valves 46 and 47 to unseat. The two rams 26 and 27 are thus connected in parallel with the pump 41 and fluid under pressure applied to valve unit 43 flows past ball check valve 47 and through a line 48 to the right-hand end of the ram 26, and past ball check valve 46 and through a line 49 to the left-hand end of ram 27 to move the clamps 16 and 17 apart. Fluid from the ram 26 returns through a line 50, ball check valve 29, a line 51, ball check valve 45, which is now unseated, a line 52, valve 38, and a line 53 to reservoir 54. Fluid returns from ram 27 to the reservoir 54 through a line 55, ball check valve 30, a passage 56 in valve 28, line 51, ball check valve 45, line 52, valve 38 and line 53.

If it is desired to move the clamps 16 and 17 toward each other to grip a load, the slide 39 of the valve 38 is moved downwardly from the position shown in FIG. 10, to connect line 40 from the pump 41 with line 52 to admit fluid under pressure to the valve unit 43. Admission of fluid under pressure through line 52 to the valve unit 43 causes ball check valve 45 to open and also causes a piston 57 and a piston 58 to open ball check valves 46 and 47. The rams 26 and 27 are, therefore, again connected in parallel, but fluid under pressure is admitted to the left-hand end of ram 26 through ball check valves 45, line 51, ball check valve 29 and line 50, and is admitted to the right-hand end of ram 27 through ball check valve 45, line 51, ball check valve 29, passage 56, ball check valve 30, and line 55, so that the clamps 16 and 17 are moved toward each other to grip a load as indicated at L in FIGS. 10A and 10B. Fluid is returned from the right-hand end of ram 26 to the reservoir 54 through line 48, ball check valve 47 which is open at this time, line 42, valve 38 and line 53. Fluid is returned from the left-hand end of ram 27 to the reservoir 54 through line 49, ball check valve 46 which is open at this time, line 42, valve 38 and line 53. It will be noted that if movement of one of the clamps 16 and 17 is impeded, or resisted as when one clamp engages the load first, all of the fluid may flow through passage 56 to either ram 26 or 27 which operates the other clamp until the pressure exerted by both clamps on the load is equal. It is, therefore, possible for the center point between the clamps to shift to one side or the other of the center line of the truck during operation of the rams in parallel to move the clamps 16 and 17 toward each other to engage a load. As will be described in detail hereafter, the control system limits such side shifting movement of the center point between the clamps, as well as side shifting movement resulting from operation of the rams in series to move the clamps in the same direction.

To connect the rams 26 and 27 in series and to move the clamps 16 and 17 in unison transversely of the truck toward the left as viewed in FIG. 10, a slide 59 of the control valve 38 is moved downwardly, as shown in FIG. 10A to connect the line 40 from the pump 41 with a line 60 which in turn connects with line 48 to the right-hand end of the ram 26 so that fluid under pressure flows to the right-hand side of the piston 26b thereof to cause the clamp 16 to move to the left. Fluid on the left-hand side of piston 26b flows through line 50, ball check valve 29, passage 56, ball check valve 30 and line 55 to the ram 27 on the right-hand side of the piston 27b thereof so that the clamp 17 is moved at the same speed and in the same direction as the clamp 16 with resulting shifting of the clamps 16 and 17 in unison toward the left. Fluid on the left-hand side of the piston 27b of the ram 27 is returned to the reservoir 54 through the line 49, a line 61, valve 38 and line 53.

If it is desired to shift the clamps 16 and 17 in unison transversely of the truck toward the right as viewed in FIG. 10, the slide 59 of the control valve 38 is moved upwardly, as shown in FIG. 10B, to connect the line 40 from the pump 41 with a line 61 which in turn is connected to line 49 to the left-hand end of the ram 27 so that fluid under pressure flows to the left-hand side of the piston 27b thereof to move the clamp 17 toward the right. Fluid on the right-hand side of the piston 27b of the ram 27 flows through line 55, ball check valve 30, passage 56, ball check valve 29 and line 50 to the ram 26 on the left-hand side of the piston 26b thereof to thereby move the clamp 16 at the same speed and in the same direction as the clamp 17. Fluid on the right-hand side of the piston 26b of the ram 26 is returned to the reservoir 54 through line 48, line 60, valve 38 and line 53.

It will be appreciated that if the control cam 33 is moved a sufficient distance to the right as viewed in FIG. 10 to release the lever 34 and the actuating rod 36, as shown in FIG. 10B, the ball check valve 29 will close under the force of its spring 31 and fluid under pressure cannot therefor flow from the right-hand side of the piston 27b of the ram 27 through line 55, passage 56 and line 50 to the left-hand side of the piston 26b of the ram 26 with the result that side shifting movement of the clamps 16 and 17 in unison toward the right is prevented. At the same time, however, fluid may flow in the reverse direction by the unseating of the ball check valve 29 by the fluid so that the clamps 16 and 17 may be side shifted toward the left or moved apart to release a load, even though the ball check valve 29 has been released by the rod 36.

If on the other hand, the control cam 33 is moved a sufficient distance to the left so that the lever 35 and actuating rod 37 are released, as shown in FIG. 10A, the ball check valve 30 will close under the force of its spring 32 and fluid under pressure cannot flow from the left-hand side of the piston 26b of the ram 26 through line 50, ball check valve 30, passage 56, and line 55 to the right-hand side of the piston 27b of the ram 27 with the result that side shifting movement of the clamps 16 and 17 in unison toward the left is prevented. At the same time, fluid may flow in the reverse direction by unseating the ball check valve 30 so that the clamps 16 and 17 may be side shifted in unison toward the right or moved apart to release a load, even though the ball check valve 30 has been released by the rod 37.

In accordance with the invention, the control cam 33 is moved only in response to side shifting movement of the center point between the clamps 16 and 17 so that the ball check valves 29 and 30 are released to prevent further side shifting movement in one direction or the other only when the center point between the clamps 16 and 17, which will correspond to the center of gravity of the usual load, has moved a predetermined safe distance on either side of the center line of the truck as determined by the length of the cam 33. The rams 26 and 27 can, therefore, be operated to side shift the clamps 16 and 17 or to move the clamps toward each other to clamp loads so long as the center point between the clamps is not side shifted beyond the predetermined distance on each side of the center line of the truck. In this connection, it should be noted that if the clamps 16 and 17 have been moved apart to engage a load and then moved toward each other to clamp the load, and one of the clamps engages the load first so that movement thereof is stopped, the other clamp will continue to move toward the load to also engage the load. If, however, before the second clamp engages the load, the center point between the clamps is shifted the predetermined safe distance to one side or the other of the center line of the truck due to such continued movement of the one clamp while the other remains stationary, then either ball check valve 29 or 30 will close to prevent further movement of the one clamp so that the load cannot be clamped and picked up at an unsafe distance from the center line of the truck. The operator of the truck can then re-orient his truck relatively to the load so that the load can be picked up with the center within the safe range on each side of the center line of the truck.

The mounting of the valve 28, control cam 33, operating levers 34 and 35, as well as a preferred form of sensing mechanism for sensing side shifting movement of the center point between the clamps and for moving the control cam 33 in response to such side shifting movement of the center point between the clamps is shown in FIGS. 1–9.

Figure 2:
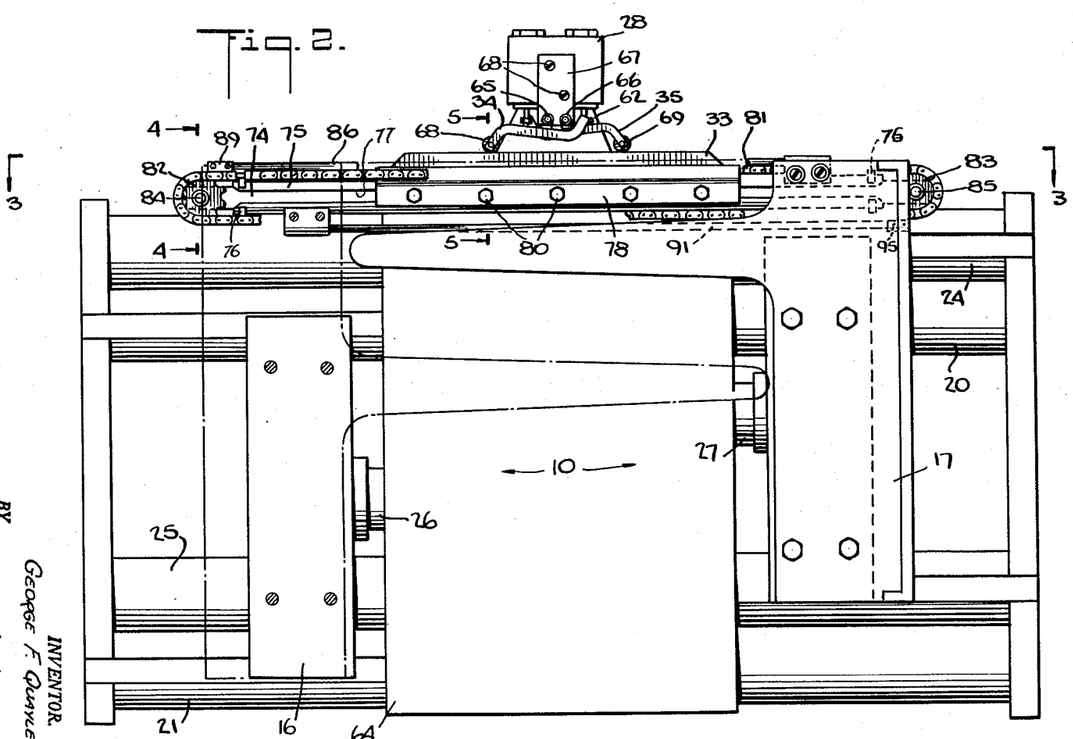
FIG. 2 is a partial front elevational view of the load clamp portion of the truck of FIG. 1 showing a preferred form of sensing mechanism for sensing side shifting movement of the center point between the clamps.
Figure 3:
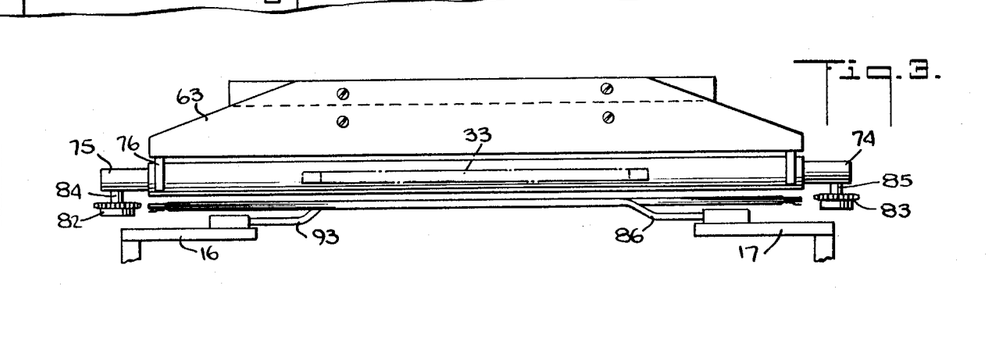
FIG. 3 is a sectional view taken on the line 3—3 of FIG. 2.
Figure 4:
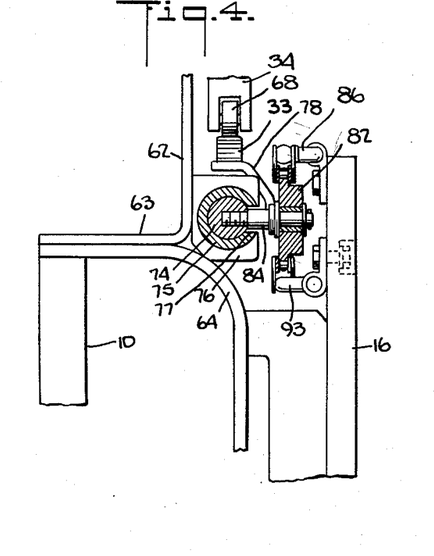
FIG. 4 is a sectional view taken on the line 4—4 of FIG. 2.

Referring particularly to FIGS. 1 and 2, the valve 28 is mounted on the vertical leg 62 of a bracket 63 in a position on the center line of the truck above the control cam 33. As best shown in FIG. 4, the bracket 63 is conveniently secured to and supported by a cover plate 64 of the load carriage 10. The operating levers 34 and 35 of the valve 28 are pivotally mounted on pins 65 and 66 which, as shown in FIG. 9, extend between the vertical leg 62 of the bracket 63 and a plate 67 which is secured to the face of the valve 28 by means of screws 68, as shown in FIG. 2. The lower ends of the operating levers 34 and 35 are provided with rollers 68 and 69 respectively, which ride on the top surface of the cam 33, and the upper ends 70 and 71 of the operating levers 34 and 35 are tapered and offset, as best shown in FIG. 9, so that they may be accommodated within the width of the valve unit 28. The upper ends 70 and 71 are adapted to engage the lower surface of the valve unit 28 to limit the extent of downward pivotal movement of the lower ends of the levers 34 and 35 carrying the rollers 68 and 69. As best shown in FIG. 10, the lower ends of the actuating rods 36 and 37 are engaged by adjustable bolts 72 and 73 which are carried by the operating levers 34 and 35, and may be adjusted to insure proper positioning of the rods 36 and 37.

Figure 5:
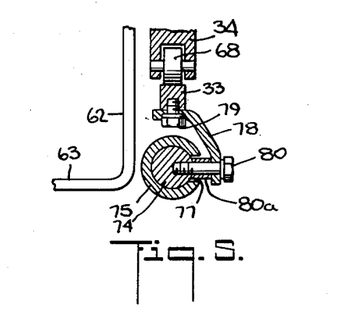
FIG. 5 is a sectional view taken on the line 5—5 of FIG. 2.

As best shown in FIGS. 2, 4 and 5, the control cam 33 is conveniently mounted for horizontal transverse movement by means of a horizontal slide 74 which is supported for horizontal sliding movement in a tubular bearing 75. The tubular bearing 75 is secured to the vertical leg 62 of the bracket 63 by means of a pair of spaced C-shaped brackets 76, and is provided with a continuous horizontal slot 77 along the front thereof. The control cam 33 is secured to and supported on the slide 74 by means of a bracket 78 which is secured by bolts 79 to the cam 33, and is secured to the slide 74 by bolts 80 which extend through the slot 77 in the tubular bearing 75. The bolts 80 are provided with sleeves 80a which engage the edges of the slot 77 and prevent the slide 74 from twisting within the tubular bearings 75, while allowing the slide 74 and the control cam 33 secured thereto to move in a horizontal direction transversely of the load carriage 10.

Referring to FIGS. 1, 2, 3 and 4, the sensing mechanism for moving the control cam 33 in response to movement of the center point between the clamps 16 and 17 transversely of the truck, includes an endless chain 81 which is trained around spaced sprockets 82 and 83 which in turn are rotatably supported on each end of the slide 74 by means of suitable shafts 84 and 85.

Figure 6:
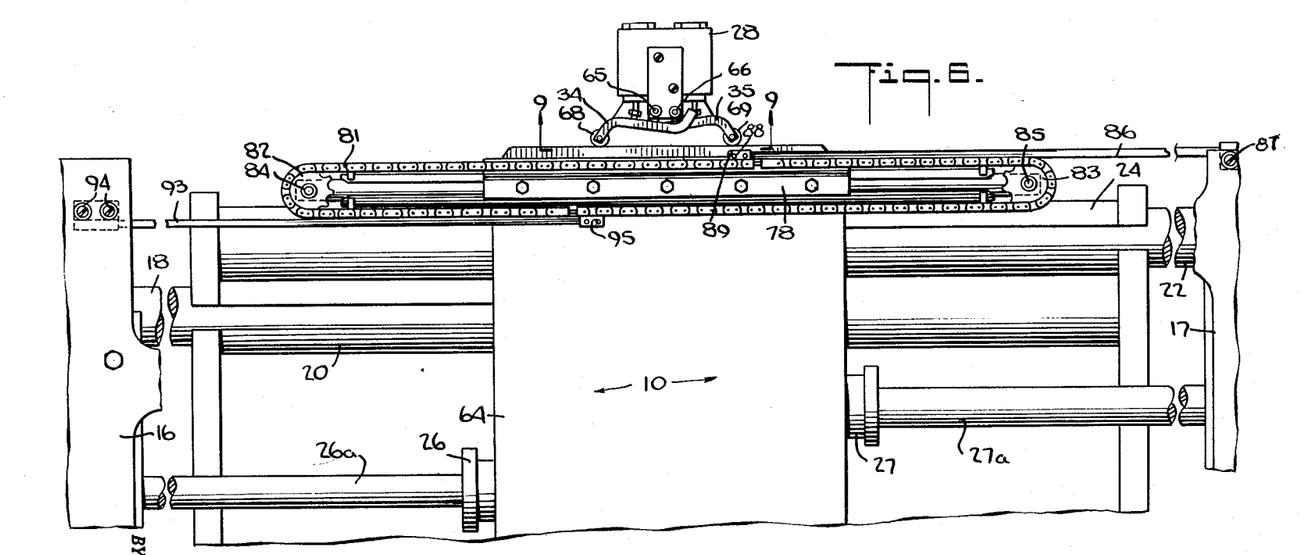
FIG. 6 is a partial front elevational view similar to that of FIG. 2 but showing the load clamps moved apart an equal distance on each side of the center line of the truck.
Figures 7, 8:
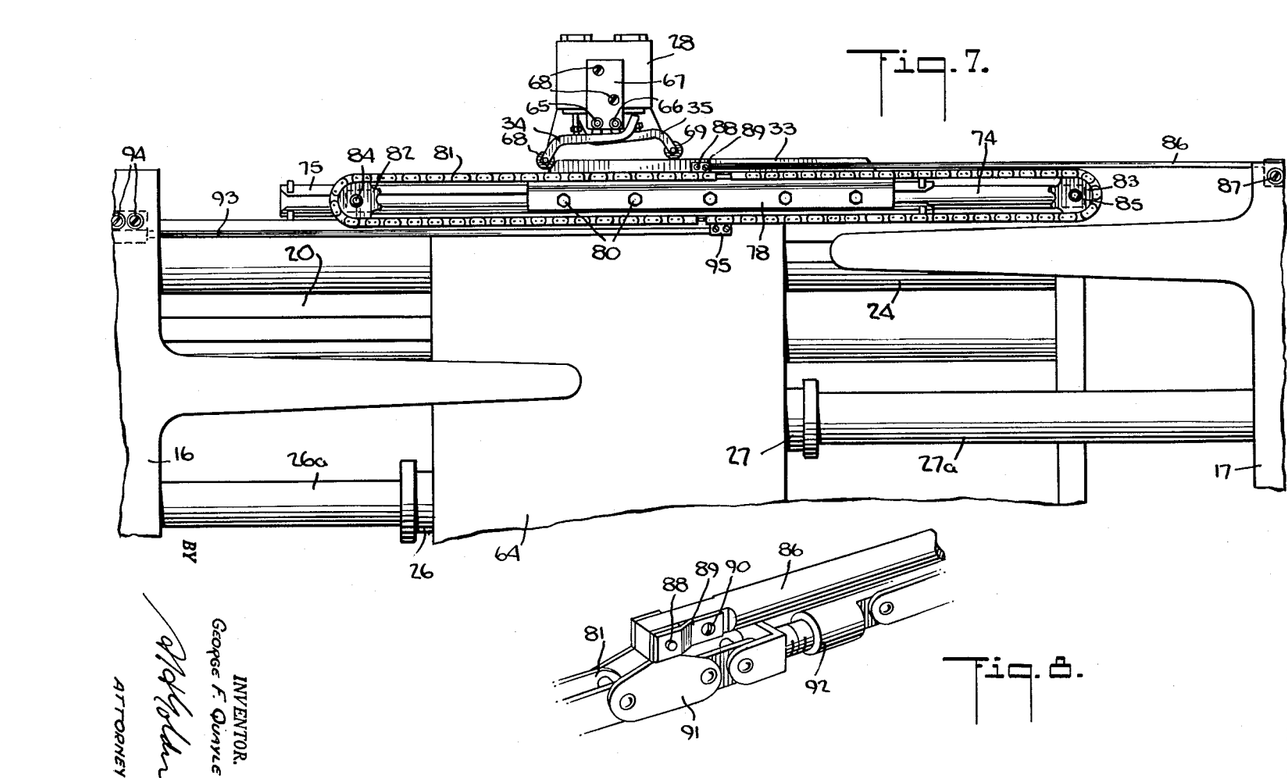
FIG. 7 is a partial front elevational view also similar to that of FIG. 2, but showing the load clamps side shifted in unison to the right and showing the control system of the invention actuated to prevent further side shifting movement in the same direction.
FIG. 8 is a perspective view of a portion of the sensing mechanism as shown in FIG. 2.

As best shown in FIGS. 1, 6 and 7, a rod 86 is secured at one end to the clamp 17 by screws 87 and is secured at the other end to the upper run of the chain 81 by means of a pin 88. As shown in FIG. 8, the pin 88 is secured to a clip 89 which in turn is attached to the end of the rod 86 by a screw 90, and the pin 88 extends through a pair of special links 91 of the chain 81 and through the end of the rod 88. An adjustable link 92 may also be provided as shown in FIG. 8 for adjusting the tension in the chain 81.

Referring again to FIGS. 1, 6 and 7, a rod 93, similar to the rod 86, is secured at one end to the clamps 16 by screws 94 and at the other end to the lower run of the endless chain 81 by means of a pin 95. By this arrangement, movement of the clamps 16 and 17 toward or away from each other at equal speeds results in equal and opposite forces being applied to the upper and lower runs of the chain 81 by the rods 89 and 93 with resulting movement of the endless chain 81 on the sprockets 82 and 83 while the slide 74 and cam 33 remain stationary. On the other hand, if the clamps 16 and 17 are moved in unison in one direction or the other, the forces applied to the chain 81 by the rods 86 and 93 will be equal and in the same direction with resulting transverse movement of the slide 74 and cam 33, but no movement of the chain 81 on the sprockets 82 and 83. Similarly, if the clamps 16 and 17 are moved at different speeds relatively to one another, there will be some movement of the chain 81 on the sprockets 82 and 83, as well as some transverse movement of the slide 74 and cam 33, with the amount of transverse movement depending on the difference in speed between the relative movements of the clamps.

Thus, the slide 74 and the cam 33 secured thereto move only in response to movement of the clamps 16 and 17 together as in side shifting or when one clamp moves relatively to the other in a manner resulting in transverse movement of the center point between the clamps. Cam 33 remains stationary during movement of the clamps towards or away from each other at equal speeds. If, therefore, the clamps 16 and 17 are moved by the rams 26 and 27 at substantially equal speeds, there is no substantial movement of the cam member 33 and neither ball check valve 29 or 30 of the valve unit 28 is released to prevent operation of either of the rams 26 or 27, and the clamps 16 and 17 may be moved by the rams from a position in which they are close together, as shown in FIG. 2, to a position in which they are spaced a considerable distance apart as shown in FIG. 6.

On the other hand, if there is side shifting movement of the center point between the clamps, regardless of the particular spacing of the clamps, the control cam 33 will be moved in response to such movement, and if the movement is sufficient to release one of the levers 34 or 35, as shown in FIG. 7, either ball valve 29 or 30 of the valve unit 28 will be actuated to prevent further side shifting movement in the same direction. Thus, the control system limits the side shifting movement of the center point between the clamps 16 and 17 to a safe distance on each side of the center line of the truck, ragardless of whether the side shifting movement is due to movement of the clamps in unison or is due to unequal movement of the load clamps in engaging a load. At the same time, however, fluid may flow to the rams 26 and 27 to side shift the clamps 16 and 17 in a reverse direction, or to move the clamps apart to release a load, by unseating either ball check valve 29 or 30, depending on which was released to prevent excessive side shifting movement.

Figure 11:
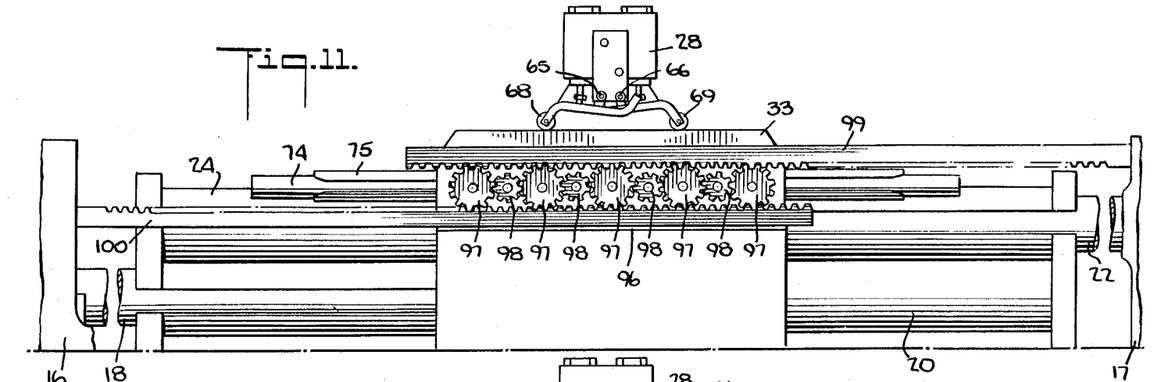
FIG. 11 is a partial front elevational view similar to that of FIG. 2, but showing a different form of sensing mechanism for sensing transverse movement of the center point between the load clamps.
Figure 12:
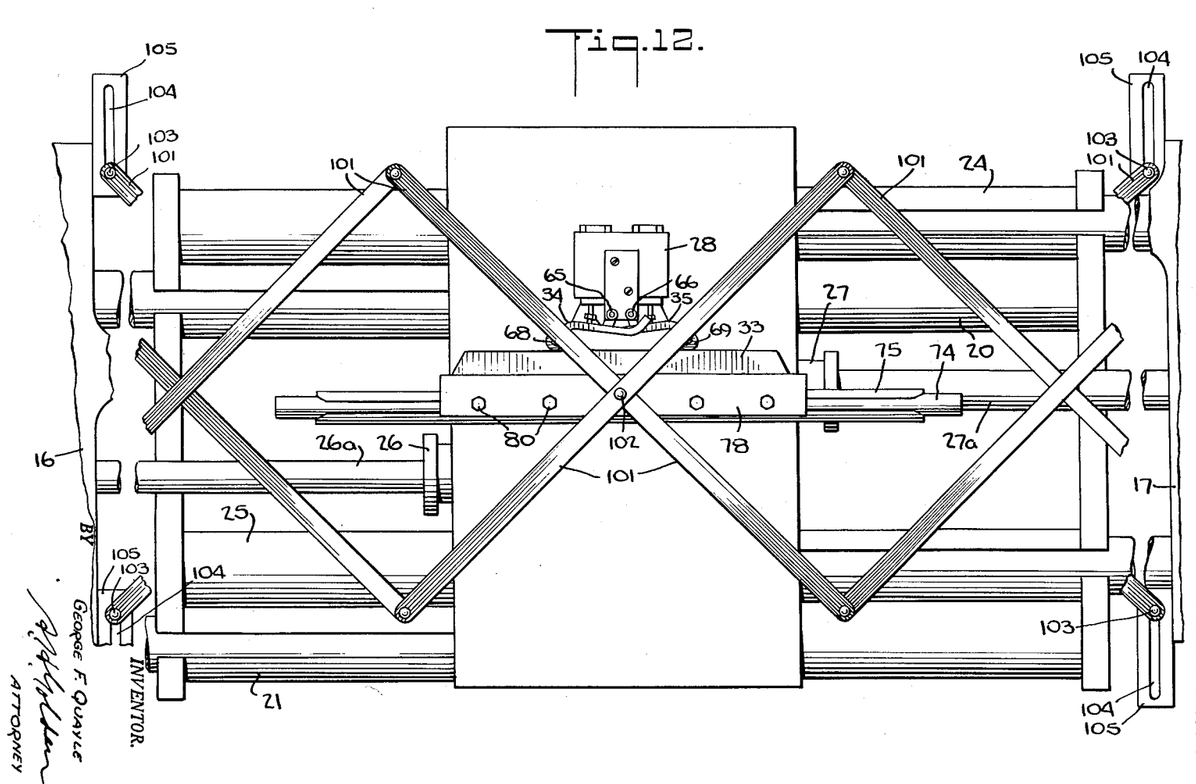
FIG. 12 is a partial front elevational view, also similar to that of FIG. 2, but showing another form of sensing mechanism for sensing transverse movement of the center point between the load clamps; and, FIG. 13 is a partial elevational view similar to that of FIG. 2, but showing still another form of sensing mechanism for sensing the transverse movement of the center point between the load clamps.
Figure 13:
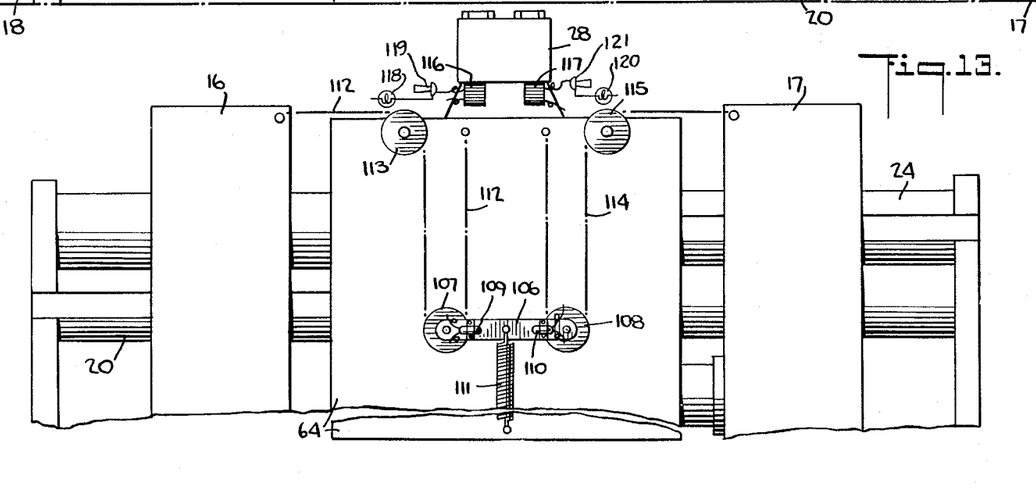

While the sensing mechanism shown in FIGS. 1–9, including the endless chain 81 and the rods 86 and 93, for moving the control member or cam 33 in response to movement of the center point between the clamps 16 and 17 transversely of the truck, is a preferred arrangement because of the simplicity and the ease of maintenance thereof, it will be appreciated that other sensing mechanisms or arrangements may be provided for the same purpose. In FIGS. 11, 12 and 13, three such arrangements are shown by way of illustration.

In the arrangement as shown in FIG. 11, the chain 81 and sprockets 82 and 83 of the arrangement as illustrated in FIGS. 1–9 have been replaced by a channel member 96 which is attached to the slide 74 and carries a series of large pinions 97 which mesh with smaller pinions 98. The cam 33 is conveniently secured to the top of the channel member 96. The rods 86 and 93 of the arrangement as illustrated in FIGS. 1–9 are replaced by racks 99 and 100 which are secured respectively to the clamps 17 and 16 and mesh with upper and lower peripheral portions of the large pinions 97. The smaller pinions 98 provide for simultaneous rotation of the pinions 97 in the same direction.

When the clamps 16 and 17 are moved toward or away from each other at equal speeds, the pinions 97 are merely rotated by the racks 99 and 100, and the channel member 96 and the cam 33 secured thereto remains stationary. If the clamps 16 and 17 are moved in unison transversely of the truck, the pinions 97 do not rotate as the forces applied thereto by the racks 99 and 100 are equal, and in the same direction, and the channel member 96 and cam 33 are moved bodily transversely of the truck and load carriage 10. If the clamps are moved at different speeds relative to one another, there is both rotation of the pinions 97 and also transverse movement depending on the difference in speed of movement between the clamps. If the transverse movement of the cam 33 is sufficient to release either lever 34 or 35, ball check valve 29 or 30 will close to prevent further side shifting movement in the same direction in the manner as previously described.

In the arrangement as illustrated in FIG. 12, the rods 86 and 93, the chain 81 and sprockets 82 and 83 of the arrangement as illustrated in FIGS. 1–9 are replaced by a lazy tong lever arrangement 101 which is pivotally secured at its center by a pivot 102 to the bracket 78 which supports the cam 33 on slide 74, and is connected at its opposite ends to the clamps 16 and 17 by pivots 103 which slide in slots 104 provided in brackets 105 secure to the clamps 16 and 17. The slide 74 and bearings 75 are preferably mounted at a lower position on the load carriage 10 than in the arrangement of FIGS. 1–9 to allow the lever arrangement 101 to be centered vertically relative to the clamps 16 and 17.

When the clamps 16 and 17 are moved toward or away from each other at equal speeds so that the center point between the clamps does not move transversely of the truck, the lazy tong lever 101 merely folds on each side of the pivot 102, and the slide 74 and the cam 33 remain stationary. If, however, the clamps 16 and 17 are moved in unison in one direction or the other, or the clamps are moved relatively to one another at unequal speeds with resulting transverse movement of the center point between the clamps, the slide 74 and the cam will be moved bodily in one direction or the other transversely of the truck and the load carriage 10 by the lazy tong lever system 101. If the transverse movement of the cam 33 is sufficient to release either lever 34 and 35, ball check valve 29 or 30 will close to prevent further side shifting movement in the same direction in the manner as previously described.

In the arrangement illustrated in FIG. 13, the rods 86 and 93, the chain 81, sprockets 82 and 83, the slide 74 and cam 33 of the arrangement as illustrated in FIGS. 1–9, are replaced by a control member or bar 106 carrying sheaves 107 and 108 at each end and mercury switches 109 and 110 adjacent each end. An extension spring 111 is secured at its lower end to the cover plate 64 of the load carriage 10 and is pivotally connected at its upper end to the center of the bar 106. A flexible cable 112 is secured at one end to the cover plate 64 adjacent the top thereof, extends around the sheave 107, around a sheave 113 secured to the cover plate 64, and is secured at the other end to the clamp 16. A similar flexible cable 114 is secured at one end to the cover plate 64 adjacent the top thereof, extends around the sheave 108, around a sheave 115 secured to the cover plate 64, and is secured at the other end to the clamp 17.

When the clamps 16 and 17 are moved at equal speeds toward or away from each other so that the center point between the clamps does not move transversely of the truck, the bar 106 remains horizontal and is merely moved up and down by the cables 112 and 114 through stretching of the spring 111 as the clamps are moved away and toward each other. If, however, the clamps 16 and 17 are moved in unison in one direction or the other, or the clamps are moved at unequal speeds with resulting transverse movement of the center point between the clamps, the bar 108 will be tilted in one direction or the other by the cables 112 and 114, depending on the direction of movement of the center point. Thus if the clamps 16 and 17 are moved in unison toward the left as viewed in FIG. 13 the bar 106 will be tilted in a clockwise direction, and if the clamps 16 and 17 are moved in unison toward the right the bar 106 will be tilted in the counterclockwise direction.

Mercury switch 109 is connected through a conventional electrical circuit with a solenoid 116 which is connected to the operating rod 36 of the ball check valve 29 and the mercury switch 110 is connected through a conventional electrical circuit with a solenoid 117 which is connected to the operation rod 37 of ball check valve 30. When the bar 106 is horizontal or tilted only a small amount, the mercury switches 109 and 110 remain open so that the solenoids 116 and 117 are not energized. If, however, the bar 106 is tilted sufficiently, one or the other of the mercury switches 109 or 110 will be closed to energize one or the other of the pair of solenoids 116 and 117 which are connected to the actuating rods 36 or 37 of the ball check valves 29 or 30 and serve when energized to withdraw rods 36 and 37 so that one or the other of the valves 29 or 30 closes to prevent further side shifting movement in the same direction.

The circuit to the solenoid 116 may be provided with a warning light 118 and a warning horn 119, and the circuit to the solenoid 117 may be provided with a similar warning light 120 and a warning horn 121 which operates when either mercury switch 109 or 110 is closed to warn the operator of the truck that the center point between the clamps 16 and 17 has reached a safe limit on one side or the other of the center line of the truck. The operator may then manually operate the valve 38 shown in FIG. 10 to stop further side shifting movement in the same direction in the event that the valve 28 should fail to operate for any reason. While the use of the valve 28 is preferred, because it provides automatic limiting of the side shifting movement, it can, of course, be eliminated and side shifting movement stopped solely by manual operation of the valve 38 when either of the light 118 or 120 or the horns 119 or 121 operate to indicate that the center point between the clamps has reached the safe limit on either side of the center line of the truck. A similar arrangement of warning lights or horns can also be provided in the arrangement of FIGS. 1–9, 11 and 12 merely by including suitable electric circuits and limit switches adapted to be actuated by the slide 74 to operate the lights or horns when the center point between the clamps has reached the safe limit on one side or the other of the center line of the truck.

From the preceding description, it can be seen there is provided a novel control system which may be used to limit the side shifting movement of the median vertical axis or center point located between a pair of load clamps of an industrial truck to a relatively small, safe range so as to minimize the danger of sidewise tipping of the truck under a load carried by the load clamps, while allowing the clamps to be moved apart over a wide range so that they may accommodate loads of a variety of width. Further, while preventing excessive side shifting in one direction, the control system still allows side shifting in the opposite direction and relative movement between the clamps to disengage a load.

While certain embodiments of the invention have been shown and described, it will be appreciated that this is for the purpose of illustration and that changes and modifications can be made thereon without departing from the spirit and scope of the invention.

I claim:

1. In a truck of the class having a pair of load engaging members and hydraulic rams for moving said members together with valve means for directing fluid under pressure to said hydraulic rams to move the load engaging members in unison toward one side or the other of the longitudinal axis of the truck and also relatively to each other to engage or disengage a load, the improvement that comprises, a movable control member, a continuous chain movable on said control member, means connecting said chain to each of said load engaging members whereby said chain and control member are moved bodily together when said load engaging members are moved in unison in one direction or another through actuation of both rams in the same direction and said chain moves relatively to said control member when said load engaging members move relatively to one another, and valve means actuated by movement of said control member to prevent the flow of fluid pressure in a particular direction to said rams when said rams have moved the load engaging members in unison to a particular position at one side or the other of the longitudinal axis of the truck.

2. In a truck having a pair of load engaging members, means for moving both said members in the same direction toward one sde or the other of the truck to side shift a load engaged by said members and for also moving said members toward and away from each other to engage or disengage a load, the improvement comprising, a movable member, means operatively connecting said movable member with each of said load engaging members whereby said movable member is moved in a particular manner only by movement of said load engaging members resulting in transverse movement of the vertical median axis located between and defined by the positions of said load engaging members, and indicating control means actuated by a predetermined movement of said movable member in the aforesaid manner to indicate when the median vertical axis located between the load engaging members has moved to a particular position at one side or the other of the longitudinal axis of the truck.

3. In a truck having a pair of load engaging members, means for moving both said members in the same direction toward one side or the other of the truck to side shift a load engaged by said members and for also moving said members toward and away from each other to engage or disengage a load, the improvement comprising, a movable member, means operatively connecting said movable member with each of said load engaging members whereby said movable member is moved responsive to the position of the center point of the load, and control means actuated by said movable member to prevent further movement of said load engaging members when the center of the load has moved to a safe limit on one side or the other of the longitudinal axis of the truck.

4. In a truck of the class described having a pair of load engaging members and hydraulic rams for moving said members together with valve means for directing fluid under pressure to said hydraulic rams to move the load engaging members in the same direction toward one side or the other of the truck to side shift a load engaged by said members and also to move the load engaging members toward and away from each other to engage or disengage a load, the improvement that comprises, a movable member, means operatively connecting said movable member with each of said load engaging means whereby said movable member is moved in a particular manner only by movement of said load engaging members resulting in transverse movement of the median vertical axis located between and defined by the positions of said load engaging member, and valve means actuated by predetermined movement of said movable member in the aforesaid manner to prevent the flow of fluid pressure to said rams in a direction which would cause movement of said load engaging member resulting in transverse movement of the median axis between said load engaging members beyond a particular point on one side or the other of the longitudinal axis of the truck.

5. In a truck of the class described having a pair of load engaging members and hydraulic rams for moving said members together with valve means for directing fluid under pressure to said hydraulic rams to move the load engaging members in the same direction toward one side or the other of the truck to side shift a load engaged by said members and also to move the load engaging members toward and away from each other, the improvement that comprises, a movable control member, means operatively connecting said movable member with each of said load engaging means whereby said control member is moved in a particular manner only by movement of said load engaging members resulting in transverse movement of the median vertical axis located between and defined by the positions of said load engaging member, and check valve means actuated by predetermined movement of said movable member in the aforesaid manner to prevent the flow of fluid pressure to said rams in a direction which would cause movement of said load engaging members resulting in movement of the median vertical axis between said load engaging members beyond a particular point on one side or the other of the longitudinal axis of the truck, said check valve means when actuated permitting fluid flow in a reverse direction to said rams to effect movement of said load engaging members resulting in movement of the median vertical axis between said load engaging members toward the longitudinal axis of the truck.

References Cited in the file of this patent
UNITED STATES PATENTS

| | | |
|---|---|---|
| 1,355,453 | Carver et al. | Oct. 12, 1920 |
| 1,880,374 | Dahlstrom | Oct. 4, 1932 |
| 2,287,469 | Cochran | June 23, 1942 |
| 2,397,339 | Crosby | Mar. 26, 1946 |
| 2,541,268 | Milz | Feb. 13, 1951 |
| 2,663,443 | Schenkelberger | Dec. 22, 1953 |
| 2,726,780 | Rodman | Dec. 13, 1955 |
| 2,754,018 | Schroeder | July 10, 1956 |
| 2,795,346 | Farmer | June 11, 1957 |
| 2,847,131 | Miller | Aug. 12, 1958 |
| 2,886,197 | Harris | May 12, 1959 |
| 2,920,775 | Schenkelberger | Jan. 12, 1960 |
| 3,037,651 | Smith | June 5, 1962 |